(12) United States Patent
Furuki

(10) Patent No.: US 7,933,450 B2
(45) Date of Patent: Apr. 26, 2011

(54) WRITING INFORMATION PROCESSING SYSTEM, WRITING INFORMATION GENERATING DEVICE AND COMPUTER READABLE STORAGE MEDIUM

(75) Inventor: Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1136 days.

(21) Appl. No.: 11/653,293

(22) Filed: Jan. 16, 2007

(65) Prior Publication Data
US 2008/0066973 A1 Mar. 20, 2008

(30) Foreign Application Priority Data
Sep. 19, 2006 (JP) ................. P2006-252667

(51) Int. Cl.
*G06K 9/00* (2006.01)
(52) U.S. Cl. .................................. 382/188
(58) Field of Classification Search .......... 382/181, 382/187–189, 313–314; 178/18.01, 18.11; 345/179, 183
See application file for complete search history.

(56) References Cited

U.S. PATENT DOCUMENTS

| | | | | |
|---|---|---|---|---|
| 4,016,414 A * | 4/1977 | Browning et al. | ............ | 362/118 |
| 5,544,967 A * | 8/1996 | Yao | ................ | 401/195 |
| 5,627,349 A * | 5/1997 | Shetye et al. | ............. | 178/18.01 |
| 5,729,251 A | 3/1998 | Nakashima | ................ | 395/200.2 |
| 6,000,809 A * | 12/1999 | Belo | ............................ | 362/118 |
| 6,959,866 B2 | 11/2005 | Takahashi et al. | | |
| 7,231,181 B2 * | 6/2007 | Kohli et al. | ................... | 455/41.2 |
| 7,231,601 B2 * | 6/2007 | Sako et al. | .................... | 715/224 |
| 7,463,794 B2 * | 12/2008 | Lapstun et al. | .............. | 382/313 |
| 7,654,463 B2 * | 2/2010 | Mitamura | ............... | 235/472.03 |
| 2006/0197755 A1 * | 9/2006 | Bawany | ....................... | 345/179 |

FOREIGN PATENT DOCUMENTS

| | | |
|---|---|---|
| CN | 1750688 A | 3/2006 |
| JP | 8-221180 | 8/1996 |
| JP | 2003-500731 | 7/2003 |
| JP | 2004-94907 | 3/2004 |
| WO | WO 00/72131 | 11/2000 |

* cited by examiner

*Primary Examiner* — Daniel G Mariam
(74) *Attorney, Agent, or Firm* — Morgan, Lewis & Bockius LLP

(57) ABSTRACT

A writing information processing system includes a writing information generating device and an information processing device. The writing information generating device generates writing information relating to a user's writing operation on a medium. The information processing device acquires the writing information from the writing information generating device and stores the writing information. The writing information generating device includes an operation status detector and a visible light generator. The operation status detector detects a current operation status of the writing information generating device. The visible light generator generates visible light representing the detected current operation status of the writing information generating device.

20 Claims, 11 Drawing Sheets

WRITING INFORMATION PROCESSING SYSTEM, WRITING INFORMATION GENERATING DEVICE AND COMPUTER READABLE STORAGE MEDIUM

CROSS-REFERENCE TO RELATED APPLICATIONS

This application is based on and claims priority under 35 U.S.C. §119 from Japanese Patent Application No. 2006-252667 filed Sep. 19, 2006.

BACKGROUND

The invention relates to a writing information processing system for processing writing information achieved by computerizing writing on a medium such as a sheet of paper.

SUMMARY

According to an aspect of the invention, a writing information processing system includes a writing information generating device and an information processing device. The writing information generating device generates writing information relating to a user's writing operation on a medium. The information processing device acquires the writing information from the writing information generating device and stores the writing information. The writing information generating device includes an operation status detector and a visible light generator. The operation status detector detects a current operation status of the writing information generating device. The visible light generator generates visible light representing the detected current operation status of the writing information generating device.

BRIEF DESCRIPTION OF THE DRAWINGS

Exemplary embodiments of the invention will be described in detailed below with reference to the accompanying drawings wherein.

DETAILED DESCRIPTION

Exemplary embodiments of the invention will be described in detail with reference to the accompanying drawings.

Figure 1:
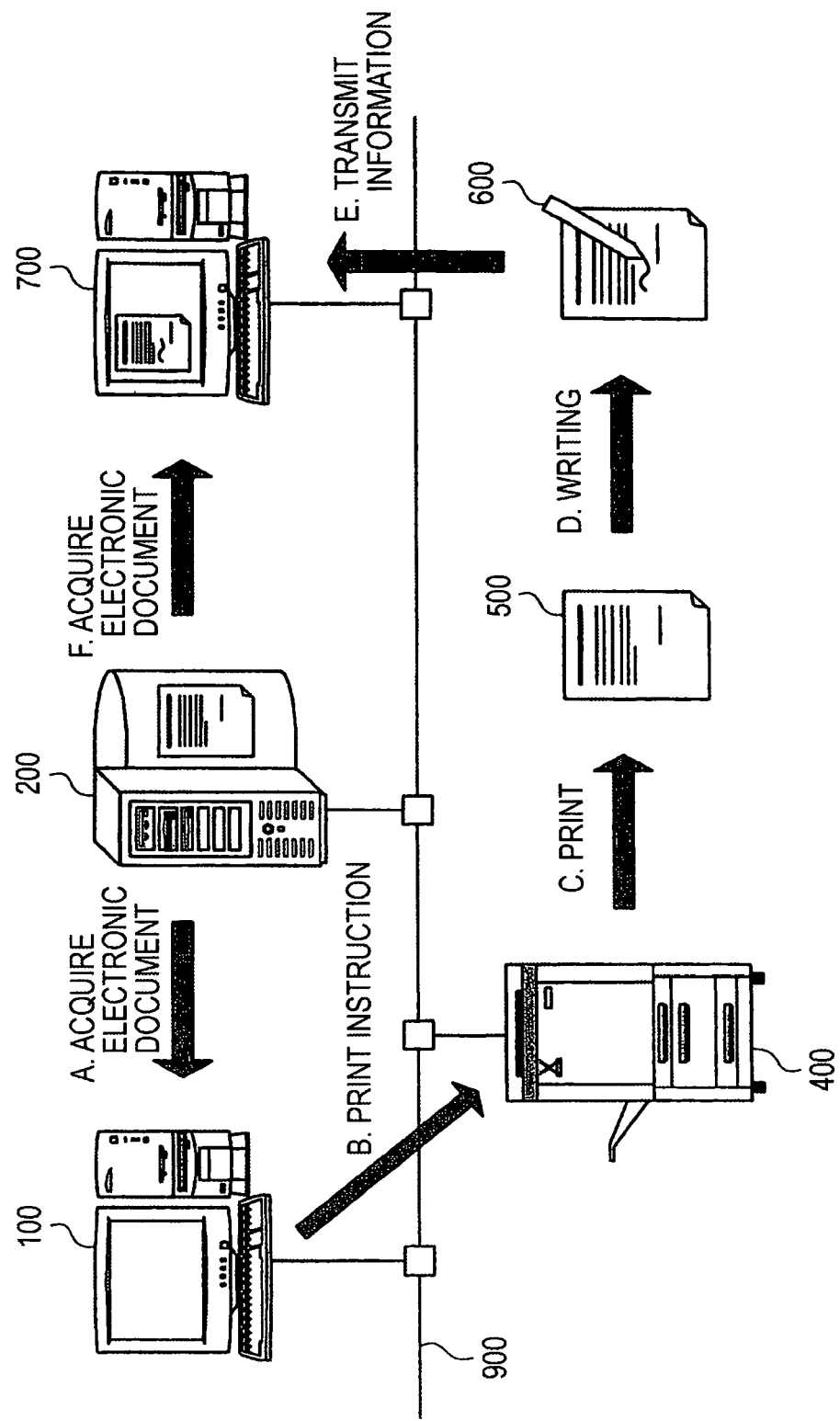
FIG. 1 is a diagram showing an example of the configuration of a writing information processing system according to an exemplary embodiment of the invention.

FIG. 1 shows an example of the configuration of a writing information processing system according to this exemplary embodiment. The writing information processing system of this exemplary embodiment includes a terminal device 100 for instructing print of an electronic document, a document server 200 for storing electronic documents, and an image forming device 400 for printing a superposition image of an image of the electronic document and a code pattern image.

Furthermore, the writing information processing system of this exemplary embodiment includes, as constituent components, a printed matter 500 output by the image forming device 400, an electronic pen 600 for recording a character or a figure on the printed matter 500 and reading locus of the character or the figure, and a terminal device 700 for displaying the locus received from the electronic pen 600 and an electronic document achieved from the document server 200 with superposing the locus and the electronic document.

In the writing information processing system of this exemplary embodiment, the terminal device 100, the document server 200, the image forming device 400 and the terminal device 700 are mutually connected to each other through the network 900.

Outline of the operation of the writing information processing system of this exemplary embodiment will be described below.

First, the terminal device 100 achieves an electronic document as a print target from the document server 200 (A) Then, the terminal device 100 instructs the image forming device 400 to print this electronic document (B). At this time, the terminal device 100 designates a print attribute as a parameter regarding the printing. The print attribute contains a sheet size, an orientation, both-side printing, etc. as in the case of normal printing. Furthermore, with respect to a code pattern image, the print attribute contains designation of an area in which the code pattern image should be printed.

Upon reception of the print instruction of the electronic document, the image forming device 400 outputs the printed matter 500 such as sheet of paper on which an image achieved by superposing the code pattern image on the image of the electronic document is printed (C). In this case, the code pattern image is achieved by forming an identification code corresponding to identification information and a position code corresponding to position information into an image. Also, the code pattern image may be achieved by forming additional information, which is other information, the identification code and the position code into an image. Either the terminal device or the image forming device 400 may execute the processing of superposing the image of the electronic document and the code pattern image.

Here, information for uniquely identifying an individual medium may be adopted as the identification information. For example, the identification information may be information achieved by combining identification number of the image forming device 400 with printing serial number of media in the image forming device 400 or time and date of the printing. Alternatively, the identification information may be information, which is unified by a predetermined server so that respective information does not overlap. Further alternatively, the identification information may be pieces of information that do not uniquely identify individual media, but uniquely identify electronic documents printed on the media.

Furthermore, the position information is information for specifying the coordinate position (X-coordinate, Y-coordinate) on each medium. For example, the coordinates may be represented by a coordinate system established by setting the upper left point of the medium as the origin, setting the X-axis in the rightward direction of the medium and setting the Y-axis in the downward direction.

Furthermore, the additional information may be information about a user who instructs the printing or information as to whether or not copy prohibition is set.

The image forming device 400 forms the code pattern image as an invisible image by using invisible toner whose infrared light absorptivity is equal to or larger than a certain criteria. The document image of the electronic document may be formed as a visible image by using visible toner whose infrared light absorptivity is not more than the certain criteria. In order to ensure reading accuracy at the time when the code pattern image is read by applying infrared light, the toner used for forming the code pattern image is different in the infrared light absorptivity from the toner used for forming the document image. In this specification, the description will be made on the assumption that the code pattern image is read by applying infrared light. However, the code pattern image may be read by applying ultraviolet light.

Thereafter, it is assumed that a user writes a character or a figure on the printed matter 500 with the electronic pen 600 (D). The electronic pen 600 applies infrared light to the printed matter 500 and detects reflection light from the printed matter 500 to thereby input the code pattern image to the electronic pen 600. Then, the electronic pen 600 obtains or generates information from the code pattern image, and transmits this information to the terminal device 700 through wired communication or wireless communication (E). The transmitted information contains, for example, the identification information of the printed matter 500 and the position information of the character and/or figure written on the printed matter 500. Alternatively, the electronic pen may be configured to transmit, as the position information, locus information obtained by connecting the position information of the character and/or figure over a predetermined time period.

Thereafter, the terminal device 700 obtains an electronic document, which is an origin of the document image printed on the printed matter 500, from the document server 200 (F). Then, the terminal device 700 displays the electronic document achieved from the document server 200 and the information achieved from the electronic pen 600 with superposing.

Here, if the identification information received from the electronic pen 600 is information for uniquely identifying an individual medium, it is necessary to manage the corresponding relationship between pieces of the identification information and the electronic documents so that any of the electronic documents can be achieved on the basis of the corresponding identification information. In the writing information processing system of FIG. 1, it is not clearly described what manages the corresponding relationship. However, the corresponding relationship may be managed by any element in so far as the terminal device 700 can access to the corresponding relationship. For example, the document server 200 may manage the corresponding relationship or the image forming device 400 may manage the corresponding relationship. If the identification information received from the electronic pen 600 is information for uniquely identifying the electronic document printed on the medium, the terminal device 700 can obtain the electronic document without referring to the corresponding relationship as described above.

If the terminal device 700 receives the locus information from the electronic pen 600, the terminal device 700 displays the locus information at a position of the electronic document, which corresponds to the writing position on the printed matter 500. This is because the information of the writing position is contained in the code pattern image read by the electronic pen 600 and because the position corresponding to the display image of the electronic document can be specified from the position of the writing position.

The configuration of the writing information processing system according to the exemplary embodiment is merely an example. For example, a server computer, which relays the printing instruction from the terminal device 100 to the image forming device 400, may execute the processing of superposing the image of the electronic document and the code pattern image. The document server 20 may be installed in the terminal device 100. Furthermore, the terminal device 100 and the terminal device 700 may be formed of the same terminal device.

In this specification, the term "electronic document" is used. The term "electronic document" does not mean only data achieved by computerizing "document" containing a text. For example, the term "electronic document" may also contain image data such as pictures, photographs and figures (the image data are not limited to data are raster data or vector data) and other printable electronic data.

Next, the code pattern image printed by the image forming device 400 will be described.

Figure 2:
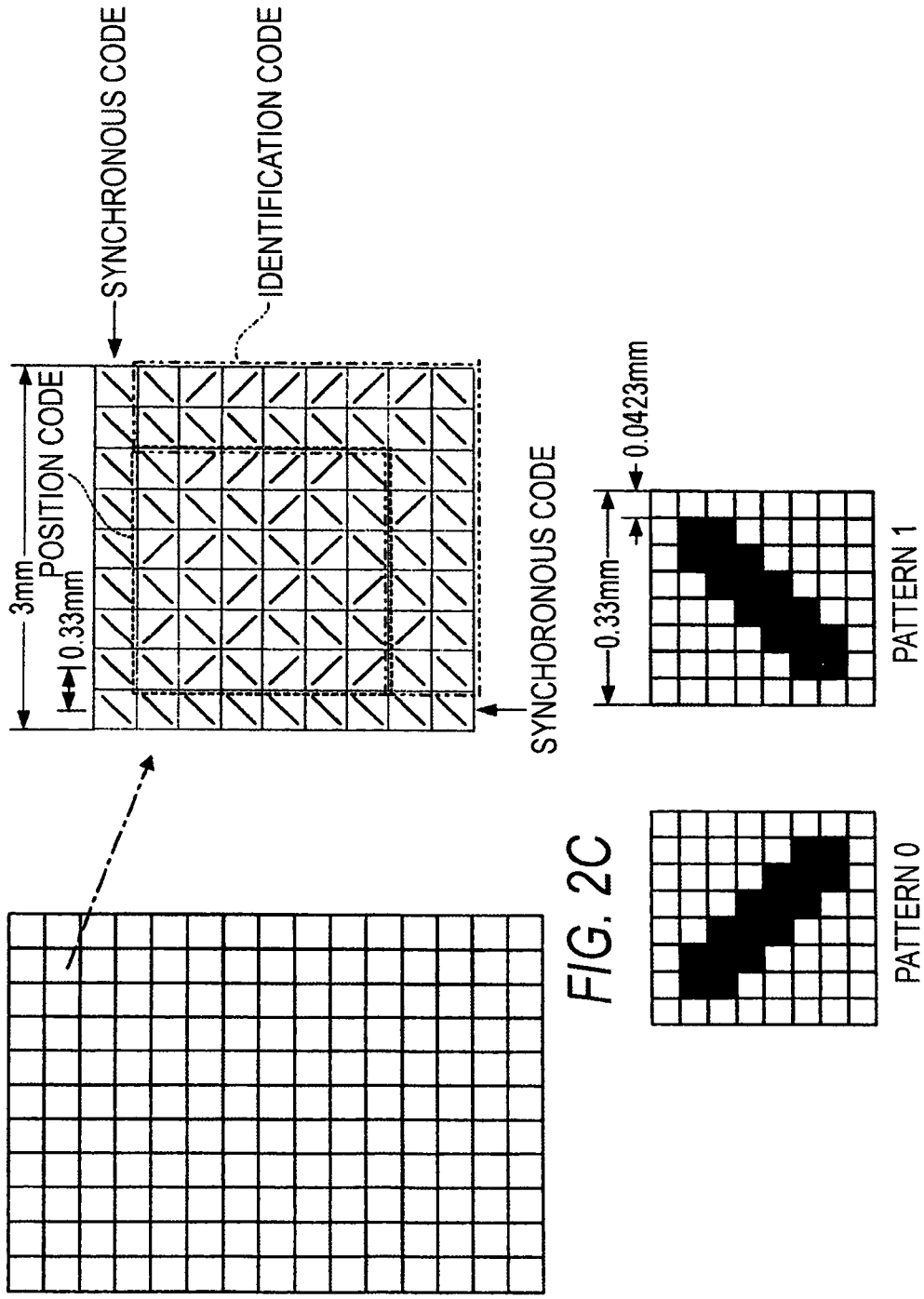
FIG. 2 is a diagram explaining a code pattern image.

FIGS. 2A to 2C are diagrams explaining the code pattern image described above. FIG. 2A schematically shows a two-dimensional code arrangement formed as an invisible image. FIG. 2B shows two-dimensional codes each of which is one unit of the two-dimensional code arrangement shown in FIG. 2A while enlarging the two-dimensional codes. Furthermore, FIG. 2C is a diagram explaining pattern images of a back slash "\" and a slash "/".

In this exemplary embodiment, the code pattern images shown in FIGS. 2A to 2C are formed with an invisible image forming material having absorption wavelength in the infrared region. The code pattern images shown in FIGS. 2A to 2C are formed with transparent toner which is an example of the invisible toner and which has the maximum absorptivity in the visible light region (400 nm to 700 nm) of 7% or less and the absorptivity in the near-infrared region (800 nm to 1000 nm) of 30% or more, for example. The invisible toner, which is an example of the image forming material, has an average dispersion diameter in a range of 100 nm to 600 nm in order to enhance the near-infrared light absorption capability required for mechanical reading of the image. Here, "visible" and "invisible" are not relevant to whether or not human's eyes can recognize the resultant image. "Visible" and "invisible" are discriminated from each other on the basis of whether or not an image formed on a printed medium can be recognized by means of presence or absence of color caused by absorption of a specific wavelength in the visible light region. Furthermore, "invisible" include the case where the resultant image has a little color caused by the absorption of the specific wavelength in the visible light region but human's eyes hardly recognize the color.

As described above, according to this exemplary embodiment, the code pattern image is formed with the transparent toner, which is the example of the invisible toner. Thereby, the identification information and the position information can be embedded without the color tone of the image printed on the medium being affected.

The code pattern image is formed of an invisible image on which the mechanical reading by application of infrared light and the decoding processing can be stably performed for a long term and in which information can be recorded with high density. Furthermore, the code pattern image may be an invisible image, which can be formed in any area of a medium irrespective of a visible-image provided area on the surface of the medium to which an image is output. Also, the code pattern image may be an invisible image, which human's eyes can be recognize by means of difference in brilliance. For example, an invisible image is formed on the whole surface of the medium (paper surface) in accordance with the size of the medium to be printed. However, "whole surface" does not mean to contain all four corners of the medium. A device of an electrophotographic system often cannot print an image in a surrounding area on a paper surface. Therefore, it is not necessary to print the invisible image in such surrounding area.

The two-dimensional code shown in FIG. 2B contains an area storing a position code indicating a coordinate position on the medium and an area storing an identification code for uniquely specifying the medium. Furthermore, the two-dimensional code also contains an area storing a synchronous code. As shown in FIG. 2A, plural two-dimensional codes are arranged in a grid form on the surface of the medium. That is, the plural two-dimensional codes are arranged as shown in FIG. 2B. Each of the two-dimensional codes has a position code, an identification code and a synchronous code. The plural areas of the position codes store different position information in accordance with the positions of the respective two-dimensional codes. On the other hand, the plural areas of the identification code store the same identification information irrespective of the positions of the two-dimensional codes.

In FIG. 2B, the position code is disposed in a rectangular area of 6 bits×6 bits. Each bit value is formed of any of plural minute line bitmaps, which are different in rotational angle. A bit value 0 and a bit value 1 are represented by pattern images (pattern 0 and pattern 1) shown in FIG. 2C. More specifically, the bit value 0 and the bit value 1 are represented by using a back slash "\" and a slash "/," which have different gradients. Each pattern image is formed of 8 pixels×8 pixels in 600 dpi. A slant line pattern extending toward an upper left side (pattern 0) represents the bit value 0, and a slant line pattern extending an upper right side (pattern 1) represents the bit value 1. Accordingly, information of one bit (0 or 1) can be represented by one pattern image. By using the minute line bit maps having two kinds of gradients, it is possible to provide two dimensional codes which give quite small noise to visible images and which can digitalize and embed a large amount of information with high density.

That is, position information of 36 bits in total are stored in the position code area shown in FIG. 2B. Of these 36 bits, 18 bits can be used for coding of the X-coordinate, and 18 bits can be used for coding of the Y-coordinate. When all the 18 bits are used for coding of positions, positions of $2^{18}$ (about 260,000) can be encoded. When each pattern image is formed of 8 pixels×8 pixels (600 dpi) as shown in FIG. 2C, since one dot at 600 dpi is equal to 0.0423 mm, the size of the two-dimensional code (containing the synchronous code) shown in FIG. 2B is equal to about 3 mm (=8 pixels×9 bits×0.0423 mm) in the vertical and lateral directions. When the positions of about 260,000 are encoded at intervals of 3 mm, the length of about 786 m can be encoded. As described above, all of 18 bits may be used for the coding of the position. Alternatively, a redundant bit for error detection or error correction may be included when a detection error of the pattern image occurs.

Furthermore, the identification code is disposed in rectangular areas of 2 bits×8 bits and 6 bits×2 bits. Identification information of 28 bits in total can be stored in the rectangular areas. When 28 bits are used for identification information, $2^{28}$ (about 270,000,000) pieces of identification information can be represented. A redundant bit for error detection or error correction may be included in 28 bits of the identification code as in the case of the position code.

In the example of FIG. 2C, the two pattern images are different in angle from each other by 90 degrees. However, if the angle difference is set to 45 degrees, four kinds of pattern images can be constructed. In the case of this construction, one pattern image can represent information of 2 bits (0 to 3). That is, when the angle types of the pattern image are increased, number of bits represented by the pattern image can be increased.

Furthermore, in the example of FIG. 2C, the bit value is encoded by using the pattern images. However, anything other than the pattern image may be adopted. For example, the encoding may be performed by ON/OFF of dots or by means of a direction along which a position of a dot is deviated from a reference position.

Next, the electronic pen 600 of this exemplary embodiment will be described.

Figure 3:
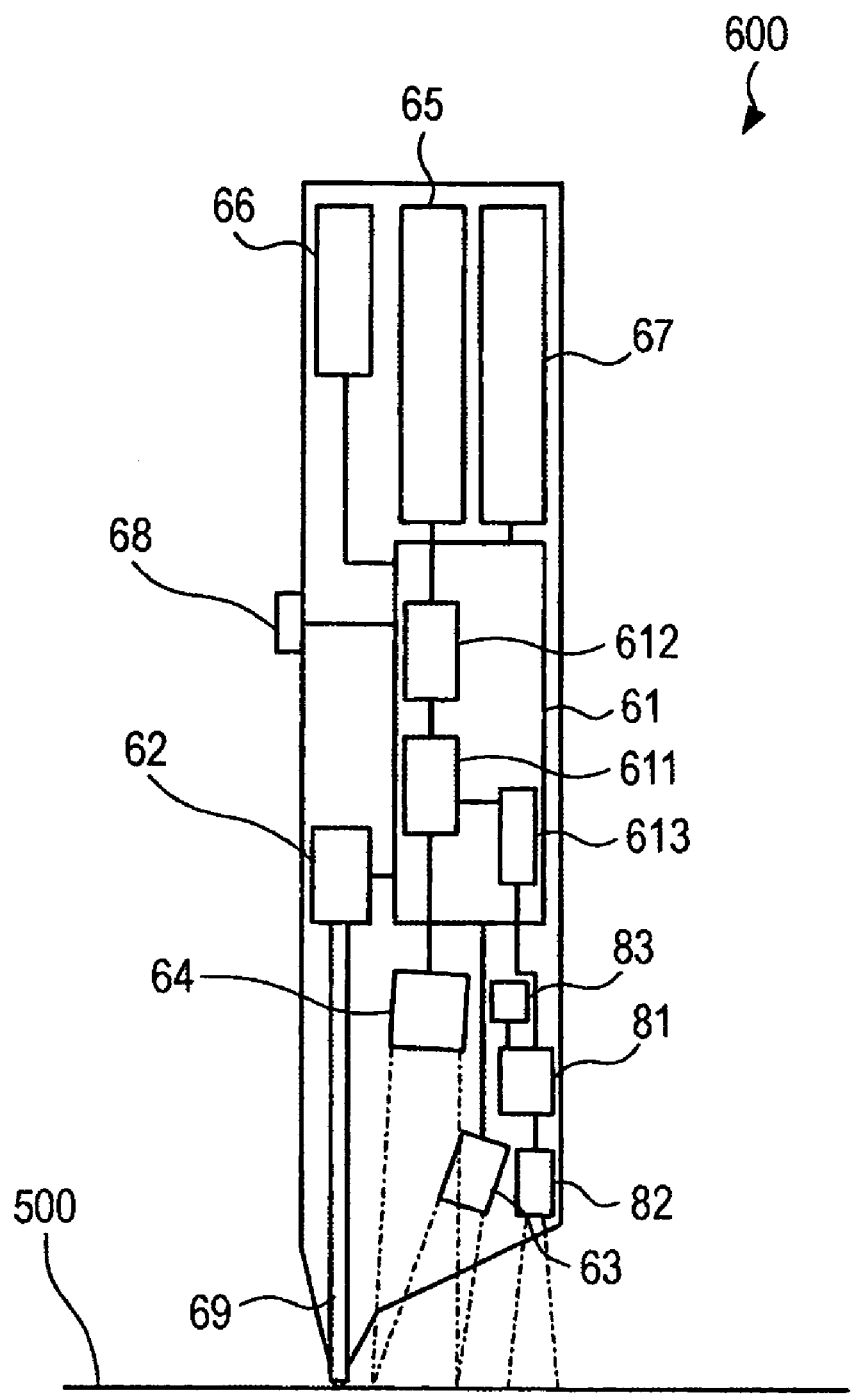
FIG. 3 is a diagram showing the configuration of an electronic pen.

FIG. 3 is a diagram showing the configuration of the electronic pen 600.

The electronic pen 600 of this exemplary embodiment includes a writing section 69 and a writing pressure detector 62. The writing section 69 has a pen chip for recording a character and/or a figure on a printed matter (may be referred to as "medium" or "sheet") having a superposition image of a document image and a code pattern image printed thereon, by the same operation as a normal pen. The writing pressure detector 62 has a pressure sensor for detecting the writing operation of the electronic pen 600 on the basis of the pressure applied to the writing section 69.

Furthermore, the electronic pen 600 of this exemplary embodiment has a controller 61, an infrared light irradiation section 63, an image input section 64, a communication section 66 and a battery 67. The controller 61 controls the overall electronic operation (which may mean the operation involving the processing of electric signals, and may be hereinafter referred to as "operation") of the electronic pen 600. The infrared light irradiating section 63 applies infrared light to read a code pattern image on the sheet 500. The image input section 64 receives the reflected infrared light to recognize and input the code pattern image. The communication section 66 controls transmitting/receiving of data and commands to/from the terminal device 700. The battery 67 drives the electronic pen 600.

Furthermore, the electronic pen 600 of this exemplary embodiment includes a visible light generator 82 and a visible light irradiation controller 81. The visible light generator 82 applies various kinds of visible light onto the sheet 500 to transmit various kinds of electronic operation statuses of the writing information processing system to the user. The visible light irradiation controller 81 generates a control signal for controlling the visible light applied by the visible light generator 82.

Here, the controller 61 of the electronic pen 600 includes an information acquiring section 611, a locus calculator 612 and a status information generator 613.

The information acquiring section 611 is a functional portion for analyzing the image input from the image input section 64 to acquire the identification information and the position information. The locus calculator 612 is a functional portion for correcting a difference between the coordinates of the pen point of the writing section 69 and the coordinates of the image captured by the image input section 64 on the basis of the position information acquired by the information acquiring section 611, and for calculating the locus of the pen point of the writing section 69.

The status information generator 613 is an example of an operation status detector. The status information generator 613 is a functional portion for detecting various kinds of the electronic operation statuses (hereinafter referred to as "status") such as the electric status of the electronic pen 600 and the status of transmitting/receiving of data and commands to/from the terminal device 700 through the communication section 66, and for generating information about the statuses (hereinafter referred to as "status information"). The status information generator 613 outputs the status information to the visible light irradiation controller 81.

Furthermore, an information storage section 65 is connected to the controller 61. The information storage section 65 stores the identification information acquired by the information acquiring section 611 and locus information calculated by the locus calculator 612.

The switch 68 is used to set any of three processing modes to the controller 61. One mode is a "normal mode" for transmitting a character and/or a figure written on the printed matter 500 to the terminal device 700. Another mode is a "reference information acquiring mode" for acquiring reference information by indicating a reference indication area 517 (see FIG. 5), which will be described later (in a second exemplary embodiment). The remaining mode is a "reference information registration mode" for setting a currently-written character or figure as the reference indication area 517, and registering allocating of the reference information to this area. For example, the state where the switch 68 is not pushed is set to the "normal mode," the state where the switch 68 is pushed once is set to the "reference information acquiring mode," and the state where the switch 68 is pushed twice is set to the "reference information registration mode."

The visible light irradiation controller 81 acquires the status information described above from the status information generator 613 of the controller 61. On the basis of the acquired status information, the visible light irradiation controller 81 generates control signals, the visible light generator 82 uses to generate various kinds of visible light having different representations to represent the various statuses such as a status that the inputting of the code pattern image from the electronic pen 600 is started, a status that an error occurs in various operations, a status where various operations are normally completed and a status that various commands are normally accepted.

An association table storage section 83 stores representation patterns of visible light, which correspond to respective statuses. The visible light irradiation controller 81 refers to an association table stored in the association table storage section 83 to generate control signals, which are used to generate visible light having different representations expressing the respective statuses.

The visible light generator 82 includes, as a light emitting section, LEDs (Light Emitting Diode) of three primary colors, that is, red, green and blue. The number of LEDs of each color may be one or plural. The visible light generator 82 emits from the light emitting section the visible light corresponding to each status on the basis of the control signal input from the visible light irradiation controller 81. The visible light generator 82 applies the visible light to a peripheral area of a position on the sheet 500 at which the writing section 69 is placed. Thereby, a visible light irradiation area is formed at the peripheral area of the position where the writing section 69 is placed.

Here, the "visible light" means light that can be recognized by human's eyes.

In the following description, the operation of the visible light generator 82 of the electronic pen 600 of this exemplary embodiment will be described. The operation of the visible light generator 82 in the "normal mode," which is normally set, will be described as a first exemplary embodiment. The operation of the visible light generator 82 when the "reference information registration mode" is set by the switch 68 as an example of special processing will be described as a second exemplary embodiment. Furthermore, the operation of the visible light generator 82 when a writing format such as color or thickness of a line for the image drawn by the electronic pen 600 is specified will be described as a third exemplary embodiment.

First Exemplary Embodiment

In the first exemplary embodiment, the operation of the visible light generator 82 of the electronic pen 600 in the "normal mode" will be described. In the normal mode, a character and/or a figure written on the printed matter 500 is transmitted from the electronic pen 600 to the terminal device 700, to thereby superpose and display in the terminal device 700 (i) an electronic document, which is an origin of a document image printed on the printed matter 500 and acquired from the document server 200, and (ii) information acquired from the electronic pen 600.

Figure 4:
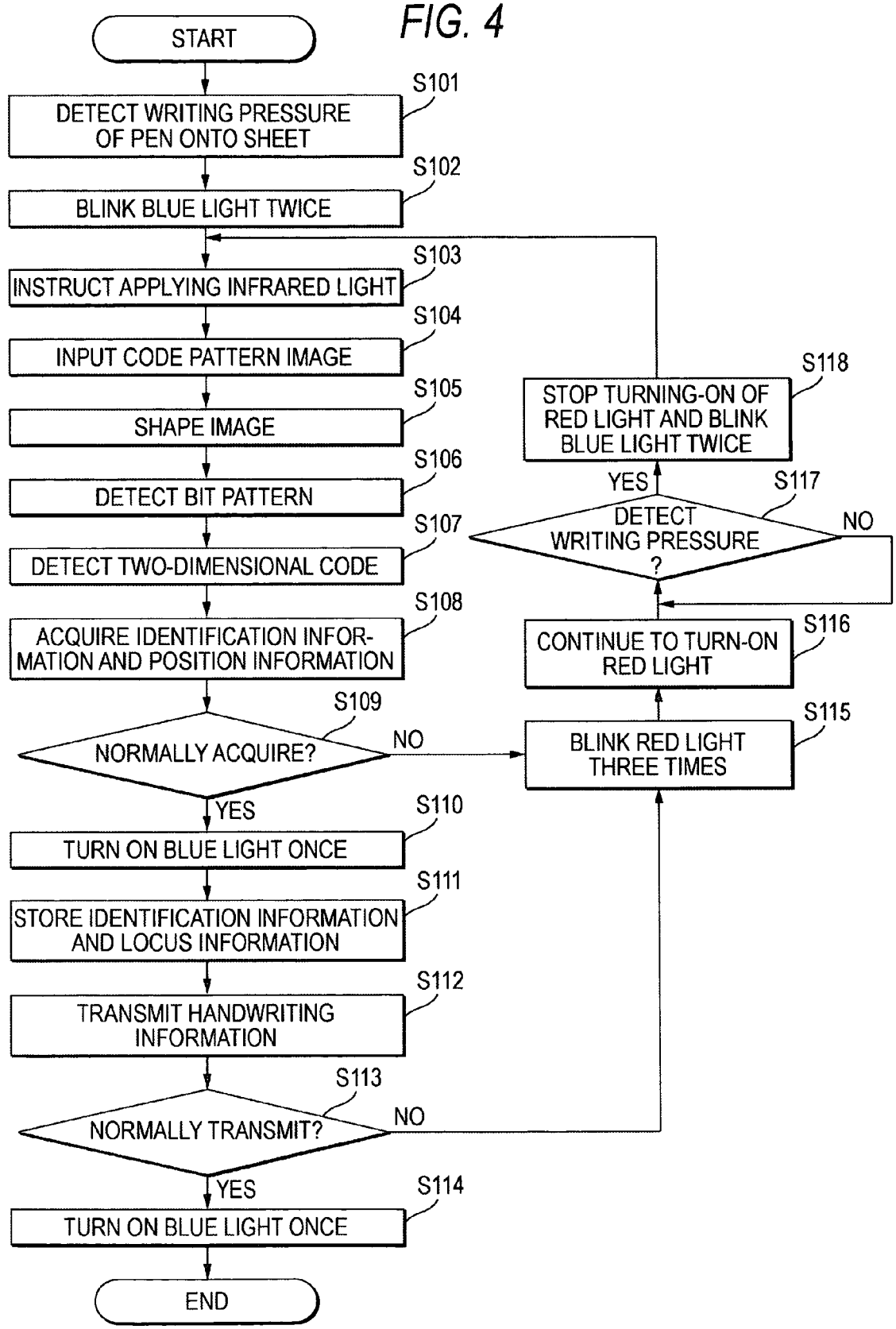
FIG. 4 is a flowchart showing an example of processing executed by a control section and a visible light irradiation controller of the electronic pen in a "normal mode"

FIG. 4 is a flowchart showing an example of the processing executed by the controller 61 of the electronic pen 600 and the visible light irradiation controller 81 of the electronic pen 600.

As shown in FIG. 4, when a user first records a character and/or a figure on the printed matter (sheet) 500, the controller 61 acquires from the writing pressure detector 62 a detection signal indicating that the electronic pen 600 is recording on the printed matter 500 (step 101).

When the controller 61 acquires the detection signal from the writing pressure detector 62, the status information generator 613 generates an input start signal. The status information generator 613 outputs the generated input start signal to the visible light irradiation controller 81. The visible light irradiation controller 81 outputs to the visible light generator 82 a control signal for causing the visible light generator 82 to blink blue light twice on the basis of the acquired input start signal. Then, the visible light generator 82 blinks the blue light twice (step 102). Accordingly, the user can know that the inputting of the code pattern image from the electronic pen 600 is started.

At the same time, the controller 61 instructs the infrared light irradiation section 63 to apply infrared light to the printed matter 500 (step 103). The infrared light applied to the printed matter 500 by the infrared irradiation portion 63 is absorbed by the invisible image, and is reflected by the other portions. The image input section 64 receives the reflected infrared light, and recognizes the portion from which the infrared light is not reflected as a code pattern image. The code pattern image is input (scanned) from the image input section 64 to the controller 61 (step 104).

Thereafter, the information acquiring section 611 of the controller 61 executes information detection processing shown in the following steps 105 to 108. First, the information acquiring section 611 shapes the input scan image (step 105).

The shaping of the scan image corresponds to correction of gradient and noise removal. The information acquiring section 611 detects bit patterns (slant line patterns) such as back slash "\" and slash "/" from the shaped scan image (step 106). Furthermore, the information acquiring section 6111 acquires a synchronous code, which is a code for positioning a two-dimensional code, from the shaped scan image. The information acquiring section 611 refers to the synchronous code position to detect the two-dimensional code (step 107). Furthermore, the information acquiring section 611 extracts and decode information such as ECC (Error Correcting code), from the two-dimensional code, and restore the decoded information to the original information, to thereby acquire the identification information and the position information (step 108).

Subsequently, the information acquiring section 611 judges whether or not the identification information and the position information are normally acquired in step 108 (step 109).

When the information acquiring section 611 judges in step 109 that the identification information and the position information are normally acquired, the status information generator 613 outputs to the visible light irradiation controller 81 a signal indicating that the identification information and the position information are normally acquired. On the basis of the input signal, the visible light irradiation controller 81 outputs a control signal for turning on blue light once to the visible light generator 82. Then, the visible light generator 82 turns on blue light once (step 110). Thereby, the user can know that the electronic pen 600 normally inputs the image.

On the other hand, when the information acquiring section 611 judges in step 109 that the identification information and the position information have not been normally acquired, the status information generator 613 outputs to the visible light irradiation controller 81 a signal indicating that abnormality occurs in acquiring the identification information and the position information. On the basis of the input signal, the visible light irradiation controller 81 outputs to the visible light generator 82 a control signal for blinking red light three times. Then, the visible light generator 82 blinks red light three times (step 115). Thereby, the user can know that the identification information and the position information have not been normally acquired.

After red light is blinked three times in step 115, the visible light irradiation controller 81 keeps the visible light generator 82 turning on red light (step 116). Then, the visible light irradiation controller 81 requests the user to write again. Thereafter, when the information acquiring section 611 acquires a detection signal from the writing pressure detector 62 again (step 117), the status information generator 613 generates an input start signal. The status information generator 613 outputs the generated input start signal to the visible light irradiation controller 81. On the basis of the input start signal, the visible light irradiation controller 81 outputs to the visible light generator 82 a control signal for blinking blue light twice. Then, the visible light generator 82 stops turning-on of the red light, and blinks blue light twice (step 118). Thereby, the user can know that the input of the code pattern image from the electronic pen 600 is restarted.

When the identification information and the position information are normally acquired (Yes at step 109) and the visible light generator 82 emits blue light once in step 110, the information acquiring section 611 of the controller 61 stores the identification information in the information storage section 65 as it is. The locus calculator 612 converts the position information into the locus information and then, stores the locus information into the information storage section 65 (step 111).

Thereafter, handwriting information (writing information) is acquired from the locus information stored in the information storage section 65, and transmitted to the terminal device 700 (step 112).

At this time, the controller 61 judges whether or not the communication between the communication section 66 and the terminal device 700 in step 112 is normally executed (step 113).

When the controller 61 judges in step 113 that the communication is normally executed, the status information generator 613 outputs to the visible light irradiation controller 81 a signal indicating that the communication is normally executed. On the basis of the input signal, the visible light irradiation controller 81 outputs to the visible light generator 82 a control signal for turning on blue light once. Then, the visible light generator 82 turns on blue light once (step 114). Thereby, the user can know that the communication between the communication section 66 and the terminal device 700 has been normally executed and that the handwriting information has been transmitted to the terminal device 700.

On the other hand, when the controller 61 judges in step 113 that the communication has not been normally executed, the status information generator 613 outputs to the visible light irradiation controller 81 a signal indicating that abnormality occurs in the communication. On the basis of the input signal, the visible light irradiation controller 81 outputs to the visible light generator 82 a control signal for blinking red light three times. Then, the visible light generator 82 blinks red light three times (step 115). Thereby, the user can know that the communication between the communication section 66 and the terminal device 700 has not been normally executed and that the handwriting information has not been transmitted to the terminal device 700.

After red light is blinked three times in step 115, the visible light irradiation controller 81 keeps the visible light generator 82 turning on red light (step 116). Then, the user is requested to write again. When the information acquiring section 611 acquires the detection signal from the writing pressure detector 62 again, the status information generator 613 generates the input start signal. The status information generator 613 outputs the generated input start signal to the visible light irradiation controller 81. On the basis of the input start signal, the visible light irradiation controller 81 outputs to the visible light generator 82 a control signal for blinking blue light twice. Then, the visible light generator 82 stops turning-on of red light, and blinks blue light twice (step 118). Thereby, the user can know that the inputting of the code pattern image from the electronic pen 600 is restarted.

When the operation or the processing is performed normally as in the steps 102, 110 and 114 in the flowchart shown in FIG. 4, the electronic pen 600 of this exemplary embodiment turns on blue light to indicate that the operation or the processing is performed normally. This is because blue generally has stereotype of "safety/normality." Also, when the operation or the processing is not performed normally as in the step 115, the electronic pen 600 turns on red to indicate that the operation or the processing is not performed normally. This is because red generally has stereotype of "danger/abnormality."

In this case, for example, in order to notify that the operation or the processing in the step 115 is not normally performed, the electronic pen 600 may continuously blink yellow before blinking red so as to inform the user that a problem occurs. This is because yellow generally has stereotype of "attention."

Also, in the electronic pen 600 of this exemplary embodiment, the light from the visible light generator 82 is applied to the peripheral area of the position (writing position) where the writing section 69 is placed on the sheet 500. This is because the user often look at the pen point when the user writes on the sheet 500 and thus, the status information can be surely transmitted to the user. This is also because the user can grasp the status information without changing his/her line of sight.

In addition, the electronic pen 600 may include an inclination sensor. When the processing flow of FIG. 4 is executed, if the electronic pen 600 is inclined by a predetermined angle or more, the electronic pen 600 emits predetermined light, for example, blinks yellow light quickly carried so as to draw user's attention.

Also, the electronic pen 600 may judges a writable area of the printed matter 500. When the writing section 69 is out of the writable area, the electronic pen 600 may emit predetermined light, for example, blink red light quickly so as to draw user's attention.

In the electronic pen 600 of this exemplary embodiment, the infrared light irradiation section 63 for reading the code pattern image and the visible light generator 82 for generating visible light corresponding to each status are configured separately from each other. However, the infrared light irradiation section 63 and the visible light generator 82 may be integrated into one chip in the same mold.

Second Exemplary Embodiment

In a second exemplary embodiment, the operation of the visible light generator 82 of the electronic pen 600 will be described when the "reference information registration mode" is set to the wiring information processing system of this exemplary embodiment. The reference information registration mode enables ex post facto access to predetermined information or function by indicating a specific area of the printed matter 500. In this case, a chart sheet 510 used in hospitals is assumed as a representative example to which it is necessary to add ex post facto reference information.

Examples of general reference information may include information for linking to specific information and information for calling a specific application program (function).

Figure 5:
FIG. 5 is a diagram showing an example of a chart form formed on a chart sheet.

Here, the chart sheet 510, which is the printed matter 500, will be first described. FIG. 5 is a diagram showing an example of a chart form formed on the chart sheet 510. The image forming device of FIG. 1 prints layout information, such as ruled lines, of the chart form on the chart sheet 510 with the visible toner. At the same time, the image forming device 400 prints a code pattern image indicating a chart ID as an example of identification information that can uniquely specify each individual chart and position information (coordinate information) of the chart sheet 510, on the whole surface of the chart sheet 510 with the invisible toner.

As shown in FIG. 5, the chart form of the chart sheet 510 is provided with patient basic information 511 such as a patient name, birth date of the patient, a face photograph of the patient, previous disease and allergy information, and an entry field 512 corresponding to the chart form of second version, for example. Furthermore, in addition to these areas, a entry type selection field 513, a past history reference instruction field 514, and a system linkage function field 515 are provided. Also, a watermark image 516 is formed with the invisible toner.

As described above, the chart ID as an example of the identification information and the position information on the sheet are printed as a code pattern image on the whole surface of the chart sheet 510. At the same time when a user handwrites on the chart sheet 510 by using the electronic pen 600, which can read the code pattern image, the electronic pen 600 detects the chart ID and the position information at the same time as the handwriting. Thereby, what position the handwriting is made on the chart sheet 510 can be acquired as electronic information. If the watermark image 516 is printed with the invisible toner, human's eyes can recognize, by means of a difference in glossiness between the watermark image 516 and the chart sheet 510, that the chart sheet 510 on which the watermark image 516 is printed is a sheet of paper on which the code pattern image including the identification information and the position information is printed with the invisible toner.

A doctor enters a medical record in the free handwriting entry field 512 formed on the chart form of the chart sheet 510 according to the diagnosis of a patient by using the electronic pen 600. The electronic pen 600 can read out the printed code pattern image, detect the chart ID and the moving locus of the electronic pen 600 on the chart sheet 510, and recognize what handwritten content is made on which chart and also where the electronic pen 600 specifies on the chart sheet 510.

Contents corresponding to S, O, A, P as shown in the entry type selection field 513 of FIG. 5 may be entered in the free handwriting entry field 512 of the chart sheet 510. For example, the doctor may specify a major complaint (S: subjective) and enter the subjective symptom of the patient. Also, the doctor may specify an objective remark (O: objective), and enter an inspection finding and/or an examination finding. Furthermore, the doctor may specify a diagnosis (A: assessment), and enter a diagnosis, a differential diagnosis, selection of a medical treatment and the ground thereof, estimation of the medical treatment, etc. Still furthermore, the doctor may specify a plan (P: plan) and enter a medical plan.

Here, it would be convenient if the doctor can refer to necessary information for a diagnosis by specifying a specific area with the electronic pen 600 when the doctor enters the medical record in the free handwriting entry field 512 of the chart sheet 510. For example, in FIG. 5, it is described in the free handwriting entry field 512 that radiograph was taken. In this case, it would be convenient if image data of the radiograph can be accessed by specifying a particular area close to that point with the electronic pen 600. Therefore, according to this exemplary embodiment, "reference information registration mode" is set by the switch 68 of the electronic pen 600 and the reference specifying area 517 is handwritten (indicated by a rectangular frame in FIG. 5), to thereby enable to access to desired information or function by merely specifying the reference specifying area 517 with the electronic pen 600.

Figure 6:
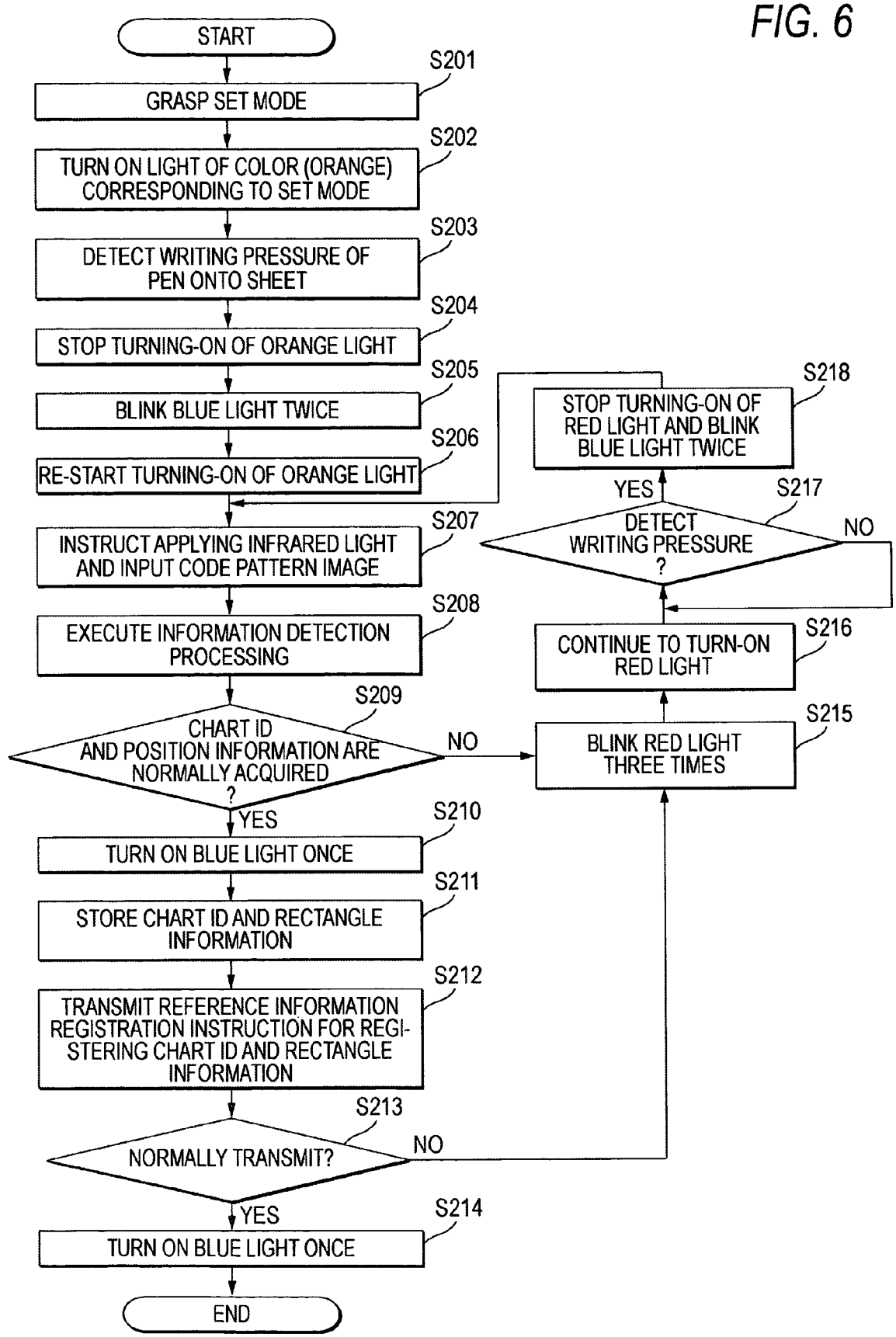
FIG. 6 is a flowchart showing an example of processing executed by the control section and the visible light irradiation controller of the electronic pen when a "reference information registration mode" is set.

FIG. 6 is a flowchart showing an example of the processing executed by the controller 61 of the electronic pen 600 and by the visible light irradiation controller 81 of the electronic pen 600 when the "reference information registration mode" is set.

As shown in FIG. 6, the controller 61 first grasps a set mode based on the signal from the switch 68 (step 201). The controller 61 outputs a signal representing the set mode to the visible light irradiation controller 81. The visible light irradiation controller 81 outputs a control signal for turning on light whose color corresponds to the set mode to the visible light generator 82, based on the signal representing the achieved mode. For example, the visible light generator 82 turns on orange light as the light corresponding to the "reference information registration mode" (step 202). In this case, for example, when the "normal mode" is set, lighting of the visible light generator 82 may be prohibited. Furthermore, when "reference information acquiring mode" is set, ultraviolet light may be turned on as the light corresponding to this mode.

When a special processing mode such as "reference information registration mode" or "reference information acquiring mode" is set, the lighting of color set in step 202 is continued until a series of processing is finished except for the case of notifying another status.

Subsequently, when the user records a character and/or a figure on the chart sheet 510 with the electronic pen 600, the controller 61 acquires from the writing pressure detector 62 a detection signal indicating that pen-based recording is carried out on the chart sheet 510 (step 203).

When achieving the detection signal from the writing pressure detector 62, the status information generator 613 of the controller 61 generates an input start signal. Then, the status information generator 613 outputs the generated input start signal to the visible light irradiation controller 81. The visible light irradiation controller 81 temporarily stops lighting of orange set in step 202 based on the acquired input start signal, and then outputs a control signal for blinking blue light twice to the visible light generator 82. Then, the visible light generator 82 stops lighting of orange (step 204), and blinks blue light twice (step 205). Thereby, the user can know that the input of the code pattern image from the electronic pen 600 is started.

After the blue light is blinked twice in step 206, the lighting of orange is restarted (step 206)

Subsequently, the controller 61 instructs the infrared light irradiation section 63 to apply infrared light to the chart sheet 510. Then, an invisible image absorbs the infrared light applied to the chart sheet 510 by the infrared light irradiation portion 63, and the other portions of the chart sheet 510 reflects the applied infrared light. The image input section 64 receives the reflected infrared light, and recognizes portions from which no infrared light is reflected, as a code pattern image. The controller 61 inputs (scans) this code patter image from the image input section 64 (step 207).

Thereafter, the information acquiring section 611 of the controller 61 executes the following information detection processing (step 208). That is, in the information detection processing at step 208, the information acquiring section 611 first shapes the input scan image. The shaping of the scan image may be correction of inclination, noise removal, etc. Then, the information acquiring section 611 detects bit patterns (slant line patterns) such as back slash "\" and slash "/" from the shaped scan image. Furthermore, the information acquiring section 611 detects a synchronous code, which is a code for positioning a two-dimensional code, from the shaped scan image and detects the two-dimensional code while referring to the synchronous code position. Furthermore, the information acquiring section 611 extracts and restores information such as ECC from the two-dimensional code, and restores the decoded information to the original information. Thereby, the information acquiring section 611 acquires a chart ID, which is an example of the identification information, and the position information.

Subsequently, the information acquiring section 611 judges whether or not the chart ID, which is the example of the identification information, and the position information are normally acquired at step 208 (step 209).

If the information acquiring section 611 judges at step 209 that the chart ID, which is the example of the identification information, and the position information are normally acquired, the status information generator 613 outputs to the visible light irradiation controller 81 a signal indicating that the chart ID and the position information are normally acquired. The visible light irradiation controller 81 outputs a control signal for turning on the blue light once to the visible light generator 82, based on the acquired signal. Then, the visible light generator 82 turns on the blue light once (step 210). Thereby, the user can know that the image input by the electronic pen 600 has been normally carried out. When blue light is turned on once at step 210, the same processing as the steps 204 and 206 is carried out, and lighting of orange is stopped/restarted.

At the same time when the visible light generator 82 turns on blue light once, the information acquiring section 611 of the controller 61 stores the chart ID in the information storage section 65 as it is, and the locus calculator 612 converts the position information into locus information and then stores the locus information in the information storage section 65 (step 211). Here, it is premised on that the reference specifying area 517 to be written by the electronic pen 600 is a rectangle, and that the locus information is represented by a combination of coordinates of an upper left point of the rectangular area and coordinates of a lower right point of the rectangular area (hereinafter referred to as "rectangle information"). However, handwritten area is not strictly rectangular. Thus, the handwritten area is approximated by an accurate rectangle.

In this exemplary embodiment, the "reference information registration mode" is set. Thus, the communication section 66 of the electronic pen 600 transmits a reference information registration instruction for registering the chart ID and the rectangle information (writing information), to the terminal device 700 (step 212).

In the case where the "reference information acquiring mode" is set by means of the switch 68, if a position designated by the electronic pen 600 is within the reference specifying area 517, the communication section 66 of the electronic pen 600 transmits an acquiring instruction for acquiring the reference information corresponding to the designated position, to the terminal device 700. Thereby, the terminal device 700 accesses to desired information or function based on the acquiring instruction transmitted to the terminal device 700.

When the communication section 66 transmits the reference information registration instruction for registering the chart ID and the rectangle information to the terminal device 700 at step 212, the controller 61 judges whether or not the communication between the communication section 66 and the terminal device 700 is normally carried out (step 213).

When the controller 61 judges at step 213 that the communication has been normally carried out, the status information generator 613 outputs to the visible light irradiation controller 81 a signal indicating that the communication has been normally carried out. The visible light irradiation controller 81 outputs a control signal for turning on blue light once to the visible light generator 82, based on the input signal. Then, the visible light generator 82 turns on blue line once (step 214). Thereby, the user can know that the communication between the communication section 66 and the terminal device 700 is normally carried out, and that the reference information registration instruction for registering the chart ID and the rectangle information has been transmitted. The lighting of orange is stopped before blue light is turned on once in step 214.

On the other hand, when the controller 61 judges at step 213 that the communication has not been normally carried out, the status information generator 613 outputs to the visible light irradiation controller 81 a signal indicating that abnormality occurs in the communication. The visible light irradiation controller 81 outputs a control signal for blinking red light three times to the visible light generator 82 based on the input signal. Then, the visible light generator 82 blinks red light three times (step 215). Thereby, the user can know that the communication has not been normally carried out between the communication 66 and the terminal 66 and thus the reference information registration instruction for registering the chart ID and the rectangle information has not been transmitted.

After the red light is blinked three times at step 215, the visible light irradiation controller 81 keeps in the visible light generator 82 emitting red light (step 216). That is, the color of the emitted light is changed from orange to red. Then, the electronic pen 600 request the user to write (handwrite the reference specifying area 517) again. Thereafter, when the information acquiring section 611 receives the detection signal from the writing pressure detector 62 again (step 217), the status information generator 613 generates the input start signal. The status information generator 613 outputs the generated input start signal to the visible light irradiation controller 81. The visible light irradiation controller 81 outputs a control signal for blinking blue light twice to the visible light generator 82, based on the input start signal. The visible light generator 82 stops lighting red light and blinks blue light twice (step 218). Thereby, the user can know that the input of the code pattern image from the electronic pen 600 is restarted.

Next, the processing executed by the terminal device 700 receiving the reference information registration instruction will be described.

Figure 7:
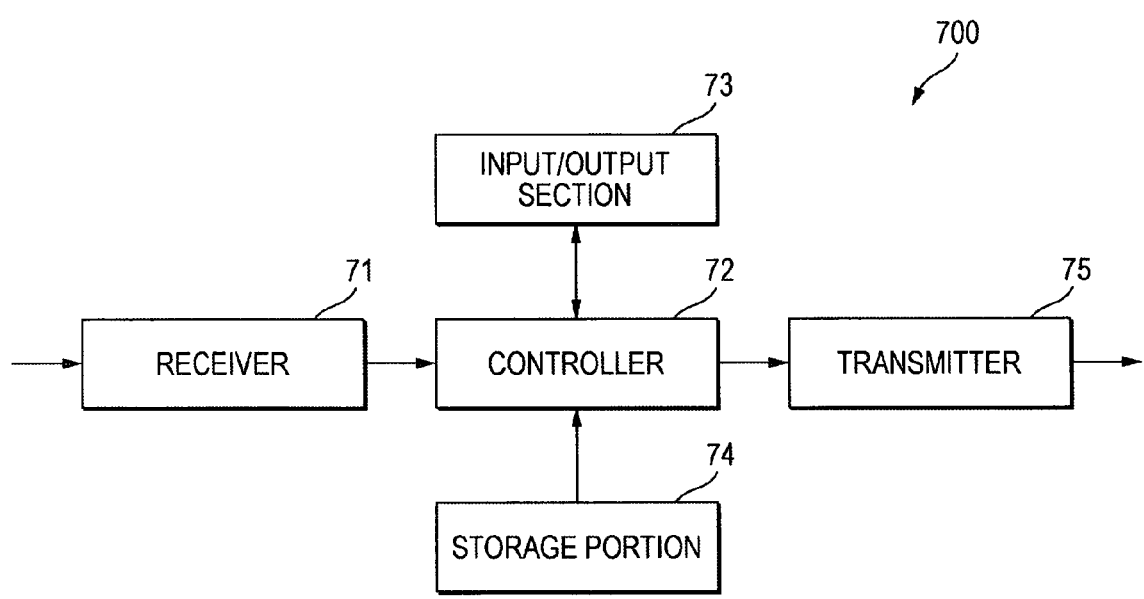
FIG. 7 is a diagram showing the functional configuration of a terminal device.

FIG. 7 is a diagram showing the functional configuration of the terminal device 700.

As shown in FIG. 7, the terminal device 700 includes a receiver 71, a controller 72, an input/output section 73, a storage section 74 and a transmitter 75.

The receiver 71 receives the reference information registration instruction from the electronic pen 600. The controller 72 controls the respective function sections in accordance with the reference information registration instruction from the receiver 71. The input/output section 73 outputs information to a display of the terminal device 700, and receives information input from a keyboard. The storage section 74 stores candidates of reference destinations of reference information, which are assigned to particular areas on a medium by a user. The storage section 74 may be implemented by a magnetic disk. The transmitter 75 outputs a registration request of the reference information to a server computer (not shown).

These function sections may be implemented by cooperation between software and hardware resources. That is, CPU (not shown) of the terminal device 700 reads a program for implementing the receiver 71, the controller 72, the input/output section 73 and the transmitter 75 from an external storage device such as a hard disk into its main memory to implement these function sections of the terminal device 700.

Figure 8:
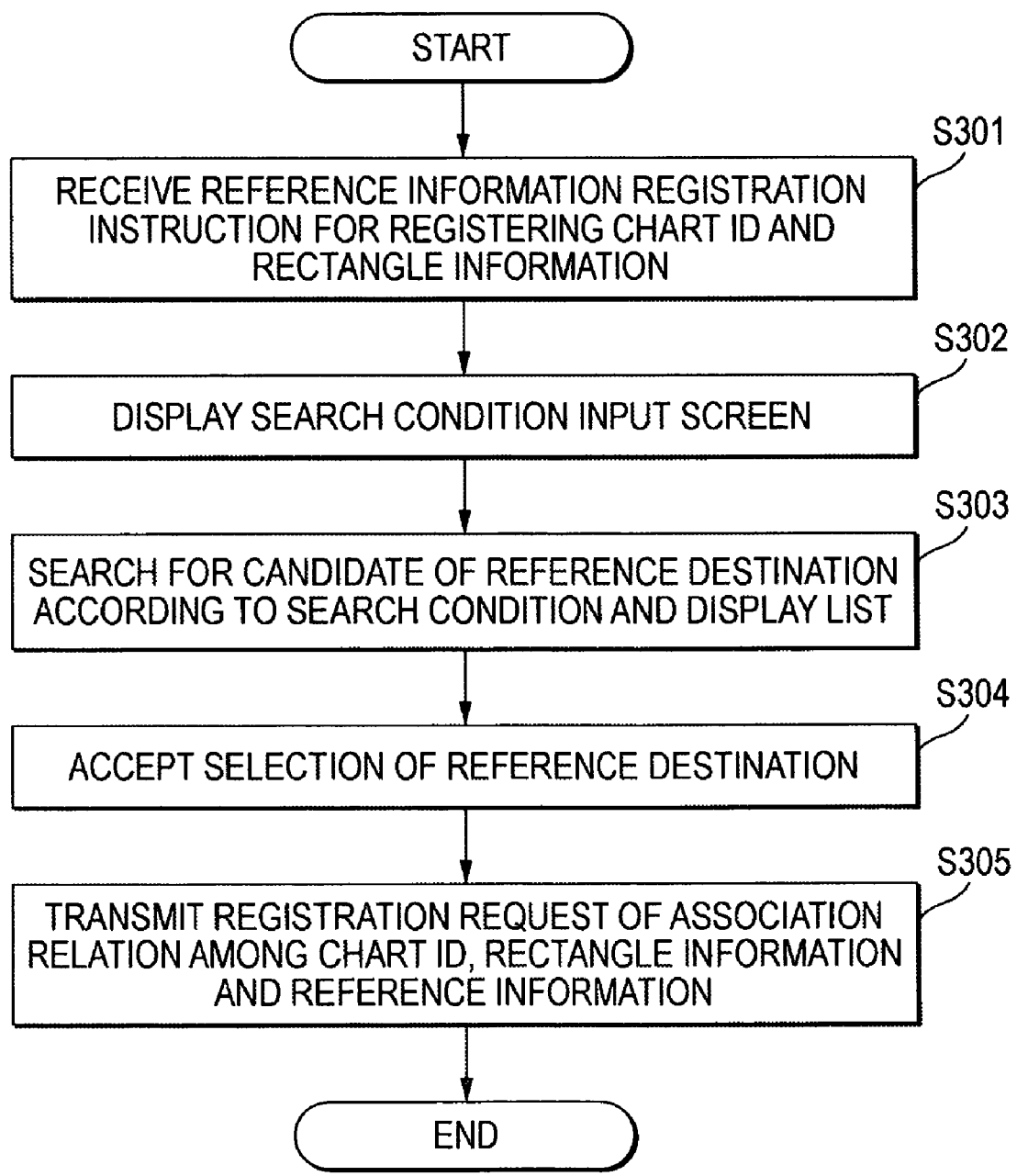
FIG. 8 is a flowchart showing an example of processing executed by the terminal device.

FIG. 8 is a flowchart showing an example of the processing executed by the terminal device 700.

First, the receiver 71 of the terminal device 700 receives the reference information registration instruction for registering the chart ID and the rectangle information, from the electronic pen 600. Then, the receiver 71 outputs to the controller 72 information indicating that the receiver 71 receives the reference information registration instruction (step 301).

Accordingly, the controller 72 instructs the input/output section 73 to display a search condition input screen used to search for a reference destination of the reference information. The input/output section 73 displays the search condition input screen according to this instruction (step 302). Examples of the search condition input screen may include a screen for narrowing down, based on a certain period, examination data associated with the chart ID.

The doctor inputs a search condition to the search condition input screen. Accordingly, the input/output section 73 accepts the search condition, and the controller 72 searches the storage section 74 for a reference destination satisfying the input search condition. Upon acquiring the reference destination, the input/output section 73 displays a list of reference destinations (step 303). The examination data (image data of radiography or image data of MRI) associated with the chart ID may be considered as the reference destination to be displayed.

When the doctor selects one of the reference destinations from the list, the input/output section 73 accepts selection information (step 304). Then, the transmitter 75 requests the sever computer (not shown) so as to register an association relation among the chart ID, the rectangle information and the reference information in a reference information table (step 305).

Third Exemplary Embodiment

In a third exemplary embodiment, described will be an operation of the visible light generator 82 when a format such as colors given to an image written by the electronic pen 600 and thickness of lines is designated in the writing information processing system of this exemplary embodiment. It is assumed that a display format (display attribute) is designated by filling a check mark in a check box set in a format setting sheet 520 with the electronic pen 600.

Figure 9:
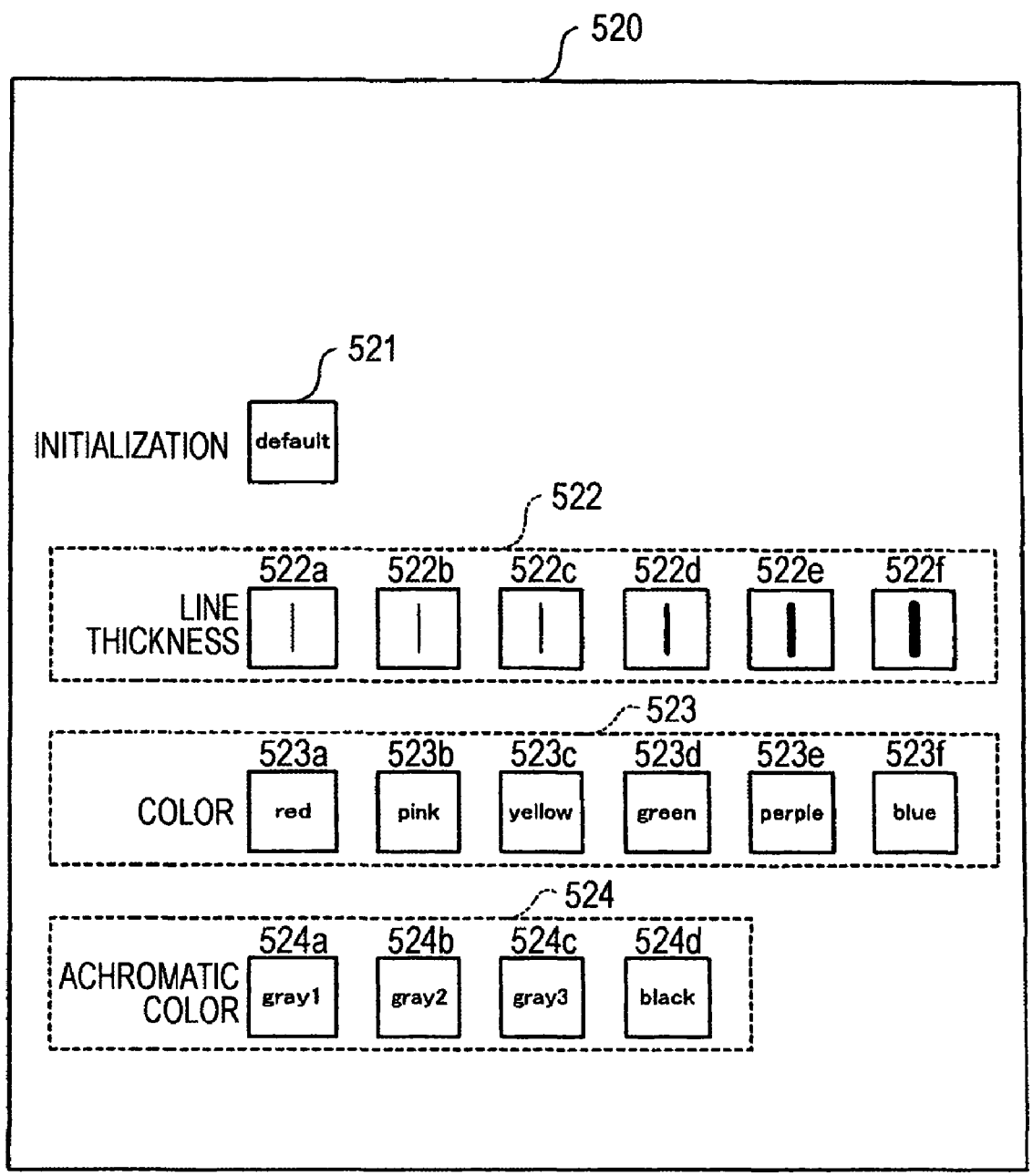
FIG. 9 is a diagram showing an example of a format setting sheet.

The format setting sheet 520, which is the printed matter 500, will be first described. FIG. 9 is a diagram showing an example of the format setting sheet 520. As shown in FIG. 9, a line thickness setting box 522 for setting a line thickness, a color setting box 523 for setting a color, an achromatic color setting box 524 for selecting any of levels of achromatic color (grey) and black, and a initializing box 521 for setting the line thickness and the color to a predetermined state are formed as items relating to the display format (display attribute) in the format setting sheet 520. The respective setting boxes 522 to 524 are provided with check boxes 522a to 522f, 523a to 523f, 524a to 524d in which detailed settings are written.

A user fills check marks in check boxes in which desired settings are written, from among the respective setting boxes 521 to 524 with the electronic pen 600. Thereby, when the terminal device 700 displays information output from the electronic pen 600 with superposing the information output from the electronic pen 600 onto an electronic document acquired from the document server 200, the display format of the information from the electronic pen 600 is set.

When a check mark is filled in a desired check box with the electronic pen 600 and the display format, in the terminal device 700, of the information from the electronic pen 600 is set, the electronic pen 600 sets an expression mode of visible light emitted from the visible light generator 82 in conformity with details of the display format.

When a check mark is filled in any one of the check boxes 522a to 522f provided to the line thickness setting box 522, the electronic pen 600 of this exemplary embodiment may vary a blinking period of the light emitted from the visible light generator 82 in accordance with the line thickness thus set. For example, as the line thickness is set to a larger value, the blinking period may be a smaller value. Accordingly, the user can roughly grasp the line thickness although he/she cannot accurately grasp the set line thickness. Therefore, the user can visually easily compare the actual set line thickness with the line thickness which the user intends to set.

Figure 10A:
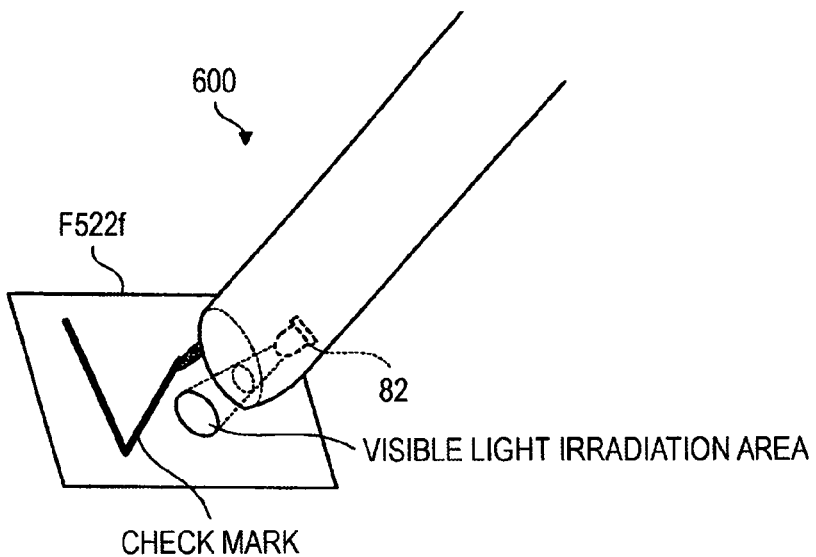
FIG. 10A shows a case where a check mark is filled in a check box 522*f*.
Figure 10B:
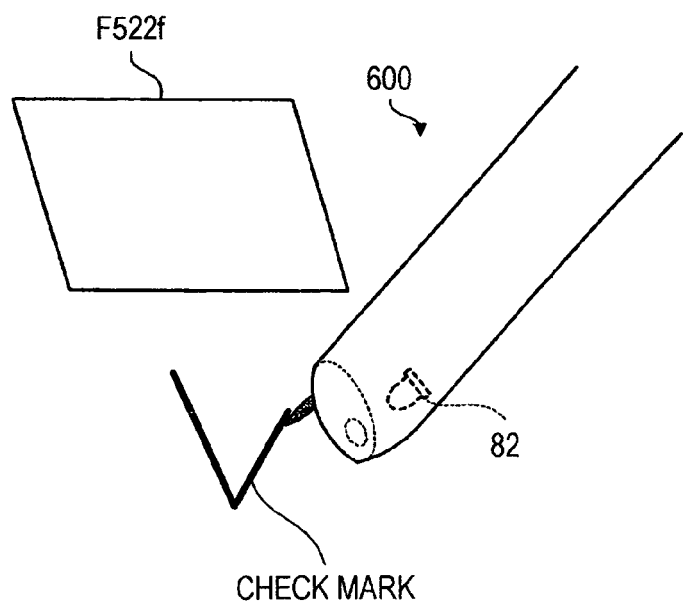
FIG. 10B shows a case where a check mark is filled in an area out of the frames of all the check boxes.

Here, FIG. 10A shows the case where a check mark is filled in the check box 522f, and FIG. 10B shows the case where a check mark is filled out of the frames of the check boxes. When a check mark is filled in the check box 522f as shown in FIG. 10A, the visible light generator 82 emits light having a blinking period corresponding to the line thickness set in the check box 522 toward the visible light irradiation area on the format setting sheet 520. On the other hand, when a check mark is filled in an area out of the frames of the check boxes as shown in FIG. 10B, the visible light generator 82 emits no light.

For example when a check mark is filled in any one of the check boxes 523a to 523f of the color setting box 523, the light emitted from the visible light generator 82 is set to the same color as set. Furthermore, at the step 102, the step 110 and the step 114 of the processing flow of FIG. 4, and further the step 205, the step 210 and the step 214 of the processing flow of FIG. 6, the visible light generator 82 may emit light of the set color to indicate that the operation or the processing has been normally carried out in place of emitting of the blue light. Accordingly, the user can visually check the set color.

Furthermore, for example, when a check mark is filled in any one of the check boxes 524a to 524d of the achromatic color setting box 524, the light amount of the light emitted from the visible light generator 82 varies in accordance with the level of the achromatic color (grey) and black. Accordingly, the user can visually check the level of the set achromatic color.

When a check mark is filled in the initialization setting box 521, the color of the light emitted from the visible light generator 82 is set to blue color as default. The visible light generator 82 emits blue light to indicate that the operation or the processing has been normally carried out. Accordingly, the user can grasp the settings of the display format as initialization.

Fourth Exemplary Embodiment

In the electronic pen 600 shown in FIG. 3, light from the visible light generator is applied to the peripheral area of the position where the writing section 69 is placed on the sheet. The visible light generator 82 of an electronic pen 610 according to this exemplary embodiment is provided at the position where the writing section 69 (the pen point of the electronic pen 600) is disposed. The same elements as the electronic pen 600 of the exemplary embodiment shown in FIG. 3 are denoted by the same reference numerals, and the detailed description thereof will be omitted.

Figure 11:
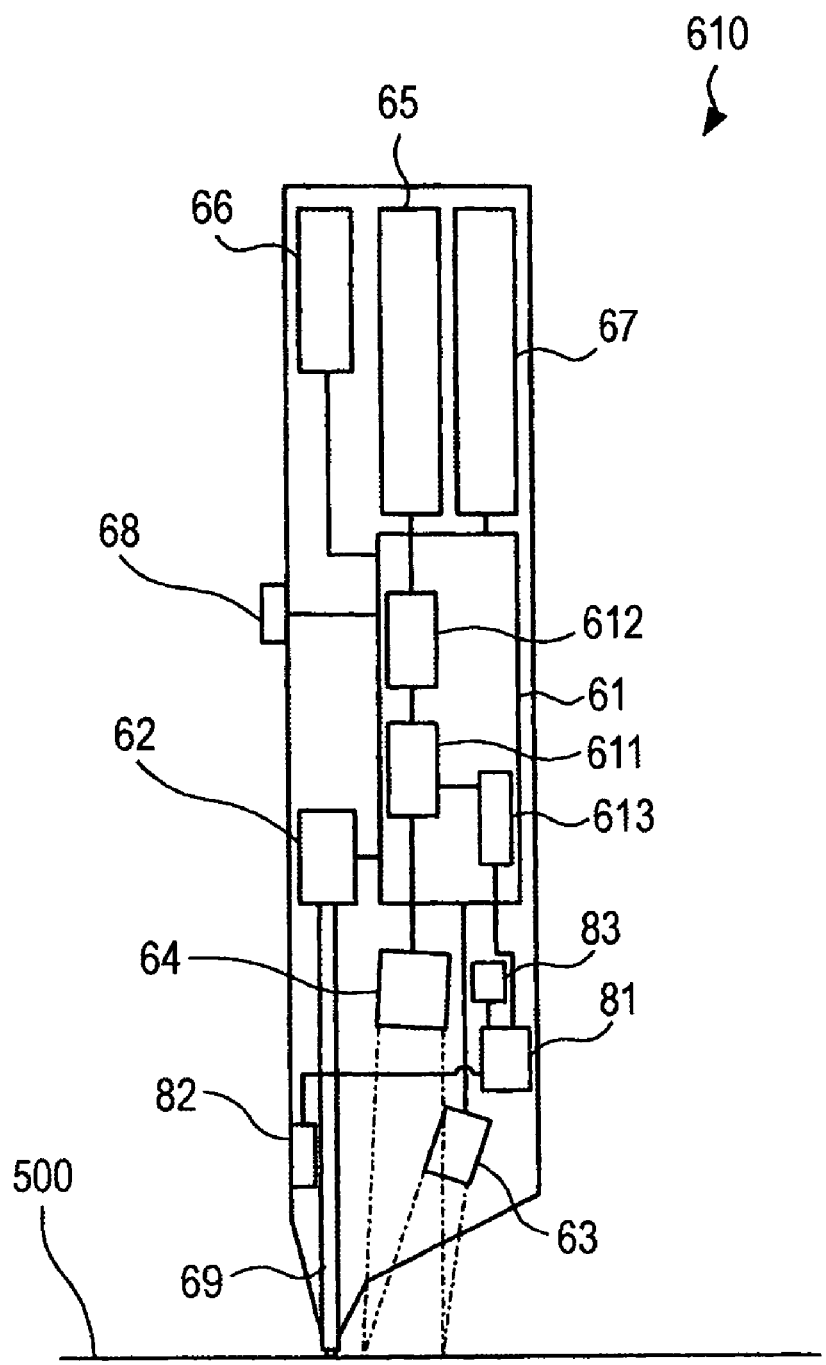
FIG. 11 is a diagram showing the configuration of the electronic pen.

FIG. 11 is a diagram showing the configuration of the electronic pen 610 of this exemplary embodiment.

The visible light generator 82 of the electronic pen 610 of this exemplary embodiment is disposed on a side surface of a position where the writing section 69 (the pen point of the electronic pen 610) is disposed. Thereby, the user can directly see light emitted from the visible light generator 82.

According to the configuration as described above, the user certainly sees the pen point when writing on the sheet. Thus, the status can be surely transmitted to the user. Furthermore, the user can grasp the status without varying his/her line of vision.

In the electronic pen 610 of this exemplary embodiment, the visible light generator 82 is disposed on the side surface of the position where the writing section 69 (the pen point of the electronic pen 610) is disposed. On the other hand, the visible light generator 82 may be disposed within the electronic pen 600, and light from the visible light generator 82 may be guided to the side surface of the pen point of the electronic pen 600 through a light guiding path. That is, if the light emitted from the visible light generator 82 is visually recognized by the user on the side surface of the pen point of the electronic pen 600, the set position of the visible light generator 82 is not limited to the inside or side surface of the electronic pen 600.

At this time, the infrared irradiation portion 63 and the visible light generator 82 may be integrated into one chip, and light from the chip is guided to the side surface of the pen point of the electronic pen 610 by using the light guiding path. By adopting the above construction, the infrared light irradiated from the infrared light irradiating section 63 is not normally visually recognized by human eyes, and thus it hardly affect the visibility of light from the visible light generator 82.

The programs implementing the above exemplary embodiments may be executed by loading a program stored in a reserved area of a hard disk, DVD-ROM or the like. Furthermore, the program may be executed by CPU of each device while stored in ROM in advance. When a rewritable ROM such as EEPROM or the like is equipped, after equipment is assembled, only the program may be provided, and installed into ROM. When the program is provided, the program is transmitted to a computer having a data storage device through a network such as the Internet or the like, and installed into ROM having the data storage device.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A writing information processing system comprising:
   a writing information generating device that generates writing information relating to a user's writing operation on a medium; and
   an information processing device that acquires the writing information from the writing information generating device and stores the writing information, wherein:
   the writing information generating device comprises:
      an operation status detector that detects a current operation status of the writing information generating device; and
      a visible light generator that generates visible light representing the detected current operation status of the writing information generating device.

2. The system according to claim 1, wherein the visible light which are generated by the visible light generator and which represent different operation statuses of the writing information generating device are different from each other.

3. The system according to claim 2, wherein each visible light generated by the visible light generator has a color set for the corresponding operation status.

4. The system according to claim 1, wherein the visible light generator forms a visible light irradiation area for representing the detected current operation status on the surface of the medium.

5. The system according to claim 4, wherein:
the writing information generating device further comprises:
a writing section that executes writing on the medium, and
the visible light generator forms the visible light irradiation area at a periphery of a position where the writing section is into substantially contact with the surface of the medium.

6. The system according to claim 1, wherein the visible light generator blinks the visible light at intervals set for the detected current operation status.

7. The system according to claim 1, wherein the visible light generator generates the visible light having a light amount set for the detected current operation status.

8. The system according to claim 1, further comprising:
an image forming device that forms on the medium at least one of (i) identification information for identifying the medium or an electronic document printed on the medium and (ii) position information representing position on the medium, wherein:
the writing information generating device generates the writing information based on the at least one of the identification information and the position information.

9. The system according to claim 8, wherein the image forming device forms a code image of an identification code, which is obtained by encoding the at least one of the identification information and the position information, on the medium with an invisible image forming material having an absorption wavelength in a substantially infrared region.

10. A writing information generating device for generating writing information relating to a user's writing operation on a medium, the device comprising:
an operation status detector that detects a current operation status of the writing information generating device; and
a visible light generator that generates visible light representing the detected current operation status of the writing information generating device.

11. The device according to claim 10, wherein the visible light which are generated by the visible light generator and which represent different operation statuses of the writing information generating device are different from each other.

12. The device according to claim 10, wherein the visible light generator applies the visible light onto a surface of the medium.

13. The device according to claim 10, wherein the visible light generator applies the visible light to a periphery of a position where the user writes on the medium.

14. The device according to claim 10, wherein the visible light generator is disposed on a side surface of an end portion of the writing information generating device.

15. A writing information generating device for generating writing information relating to a user's writing operation on a medium, the device comprising:
a visible light generator that generates visible light; and
a visible light irradiation controller that controls the visible light generated by the visible light generator, wherein:
the visible light irradiation controller controls the visible light generator to emit visible light representing a current operation status of the writing information generating device in accordance with the current operation status of the writing information generating device.

16. The device according to claim 15, wherein the visible light which are generated by the visible light generator and which represent different operation statuses of the writing information generating device are different from each other.

17. A non-transitory computer readable medium storing a program causing a computer to execute a process for notifying a current operation status of an writing information generating device, which generates writing information relating to a user's writing operation on a medium, the process comprising:
detecting the current operation status of the writing information generating device; and
generating visible light representing the detected current operation status of the writing information generating device, wherein:
the generated visible light, which represent different operation statuses of the writing information generating device, are different from each other.

18. The storage medium according to claim 17, wherein the process further comprises:
detecting at least one of (i) start of the generating of the writing information by the writing information generating device and (ii) finish of the generating of the writing information by the writing information generating device;
generating visible light representing the at least one of (i) the start of the generating of the writing information and (ii) the finish of the generating of the writing information.

19. The storage medium according to claim 17, wherein the process further comprises:
transmitting the writing information to an information processing device for storing the writing information;
detecting whether the transmitting to the information processing device is successful or in failure; and
generating a control signal used to generate visible light representing the success or failure of the transmitting.

20. The storage medium according to claim 17, wherein the process further comprises:
detecting a command input to the writing information generating device; and
generating a control signal used to generate visible light representing a type of the input command.

* * * * *